United States Patent
Wallis et al.

(10) Patent No.: US 7,747,724 B2
(45) Date of Patent: Jun. 29, 2010

(54) SYSTEM AND METHOD OF DEVICE-TO-SERVER REGISTRATION

(75) Inventors: Kenneth Wallis, Oakville (CA); Viera Bibr, Kilbride (CA); Sean Paul Taylor, Milton (CA); Brindusa Fritsch, Toronto (CA); Kamen Vitanov, Mississauga (CA); Jeff Rogers, Scarsborough (CA)

(73) Assignee: Research In Motion Limited, Waterloo, Ontario (CA)

(*) Notice: Subject to any disclaimer, the term of this patent is extended or adjusted under 35 U.S.C. 154(b) by 593 days.

(21) Appl. No.: 11/405,533

(22) Filed: Apr. 18, 2006

(65) Prior Publication Data
US 2006/0253556 A1 Nov. 9, 2006

Related U.S. Application Data

(60) Provisional application No. 60/672,042, filed on Apr. 18, 2005.

(51) Int. Cl.
*G06F 15/173* (2006.01)
*G06F 15/16* (2006.01)

(52) U.S. Cl. .................... 709/223; 709/237

(58) Field of Classification Search ............. 709/203, 709/219, 225, 227, 238, 223, 237
See application file for complete search history.

(56) References Cited

U.S. PATENT DOCUMENTS

| | | | | |
|---|---|---|---|---|
| 5,790,790 A | * | 8/1998 | Smith et al. ............. | 709/206 |
| 5,892,909 A | * | 4/1999 | Grasso et al. ............ | 709/201 |
| 6,138,158 A | * | 10/2000 | Boyle et al. ............. | 709/225 |
| 6,167,448 A | * | 12/2000 | Hemphill et al. ......... | 709/224 |
| 6,324,544 B1 | * | 11/2001 | Alam et al. ............. | 707/201 |
| 6,425,126 B1 | * | 7/2002 | Branson et al. .......... | 717/168 |
| 6,466,971 B1 | * | 10/2002 | Humpleman et al. ...... | 709/220 |

(Continued)

FOREIGN PATENT DOCUMENTS

WO  WO 01/78425  10/2001

(Continued)

OTHER PUBLICATIONS

PCT International Search Report and Written Opinion mailed Jun. 22, 2006 for corresponding PCT Application No. PCT/CA2006/000575.

(Continued)

*Primary Examiner*—Salad Abdullahi
*Assistant Examiner*—Sargon N Nano
(74) *Attorney, Agent, or Firm*—Gowling Lafleur Henderson LLP; Mark Sprigings

(57) ABSTRACT

A device-to-server registration system and method of registering a wireless device with a mediator service responsible for allowing the wireless device to communicate with a back-end service are provided. The device-to-server registration system comprises a device-to-server registration module for communicating with a device administration service of the wireless device and a device registration module of a mediator service for registering a wireless device with the mediator service. The device registration module communicates with the device-to-server registration module. The method comprises the steps of communicating with a device administration service of a wireless device to obtain information pertaining to the mediator service and communicating with a device registration module of the mediator service to register with the mediator service.

11 Claims, 12 Drawing Sheets

U.S. PATENT DOCUMENTS

| | | | |
|---|---|---|---|
| 7,209,949 B2 * | 4/2007 | Mousseau et al. | 707/201 |
| 2001/0037461 A1 | 11/2001 | Conrath | |
| 2001/0046862 A1 | 11/2001 | Coppinger et al. | |
| 2003/0101246 A1 * | 5/2003 | Lahti | 709/221 |
| 2004/0225887 A1 | 11/2004 | O'Neil et al. | |
| 2005/0027821 A1 * | 2/2005 | Alexander et al. | 709/218 |
| 2005/0055382 A1 * | 3/2005 | Ferrat et al. | 707/201 |
| 2005/0064857 A1 | 3/2005 | Coppinger et al. | |

FOREIGN PATENT DOCUMENTS

| | | |
|---|---|---|
| WO | WO 2004/059957 A | 4/2004 |
| WO | WO2004047406 A1 | 6/2004 |
| WO | WO 2005/027455 A | 3/2005 |

OTHER PUBLICATIONS

Meng, Xiaohua "Design and Implementation of a Mobile Wireless Reading System based on J2ME" Mar. 31, 2005.

* cited by examiner

SYSTEM AND METHOD OF DEVICE-TO-SERVER REGISTRATION

This non-provisional application claims the benefit of U.S. Provisional Application No. 60/672,042 filed Apr. 18, 2005, which is hereby incorporated by reference.

The present patent disclosure relates generally to a communications system for providing communications to a plurality of devices and specifically to a system and method of device-to-server registration.

BACKGROUND

Due to the proliferation of wireless networks, there are a continually increasing number of wireless devices in use today. These devices include mobile telephones, personal digital assistants (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries. These software applications take advantage of the ability to transmit data of the wireless network in order to provide timely and useful services to users, often in addition to voice communication. However, due to a plethora of different types of devices, restricted resources of some devices, and complexity of delivering large amounts of data to the devices, developing software applications remains a difficult and time-consuming task.

Currently, devices are configured to communicate with Web services through Internet-based browsers and/or native applications. Browsers have the advantage of being adaptable to operate on a cross-platform basis for a variety of different devices, but have a disadvantage of requesting pages (screen definitions in HTML) from the Web service, which hinders the persistence of data contained in the screens. A further disadvantage of browsers is that the screens are rendered at runtime, which can be resource intensive. Applications for browsers are efficient tools for designing platform independent applications. Accordingly, different runtime environments, regardless of the platform, execute the same application. However, since difference wireless devices have different capabilities and form factors, the application may not be executed or displayed as desired. Further, browser-based applications often require significant transfer bandwidth to operate efficiently, which may be costly or even unavailable for some wireless devices.

On the other hand, native applications are developed for a specific wireless device platform, thereby providing a relatively optimized application program for a runtime environment running on that platform. However, a platform dependent application introduces several drawbacks, including having to develop multiple versions of the same application and being relatively large in size, thereby taxing memory resources of the wireless device. Further, application developers need experience with programming languages such as Java and C++ to construct such native applications.

Current methods to register a wireless device (WD) with a mediator service (MS) usually are based on one of two approaches: pre-configured mediator or pre-configured application. Pre-configured mediator refers to a system where the mediator service needs to be pre-configured with information for the WD, and the mediator initiates the registration process. Pre-configured application refers to a system where an application on the WD must be configured with the information required to initiate registration, or this information must be provided by the user.

Disadvantages to the pre-configured mediator include the fact that the mediator service must be populated with the information to connect with all devices. One disadvantage is that the mediator service must initiate registration, but since a wireless device may be off, out-of-coverage, not loaded with appropriate client software, or inaccessible for any reason, the mediator service may have to try multiple times. If the device does not have the client software, the mediator service does not know how to retry once the device has the client software. If the device has an upgraded version of the registration process, due to memory and processing restrictions on a WD, it is desirable to limit the amount of backwards compatibility code required, and in the situation where the mediator initiates registration, the device may need a certain amount of backwards compatibility support. Having the device initiate registration will put this burden on the MS, which typically has much more resources to handle this.

Disadvantages to the pre-configured application include the fact that this would require that the application definition would require the identification information for the MS, or at least have an associated configuration file. Either way of changing the MS identification in order to switch MS' would require an application or file update. This would cost in either information technology (IT) personnel time or over-the-air (OTA) wireless charges. Alternatively the identification information might be provided by the user. This is less user-friendly, IT personnel has less control over the device, and introduces user error.

BRIEF DESCRIPTION OF THE DRAWINGS

An embodiment of the patent disclosure will now be described by way of example only with reference to the following drawings in which.

DETAILED DESCRIPTION OF THE PREFERRED EMBODIMENT

Figure 1:
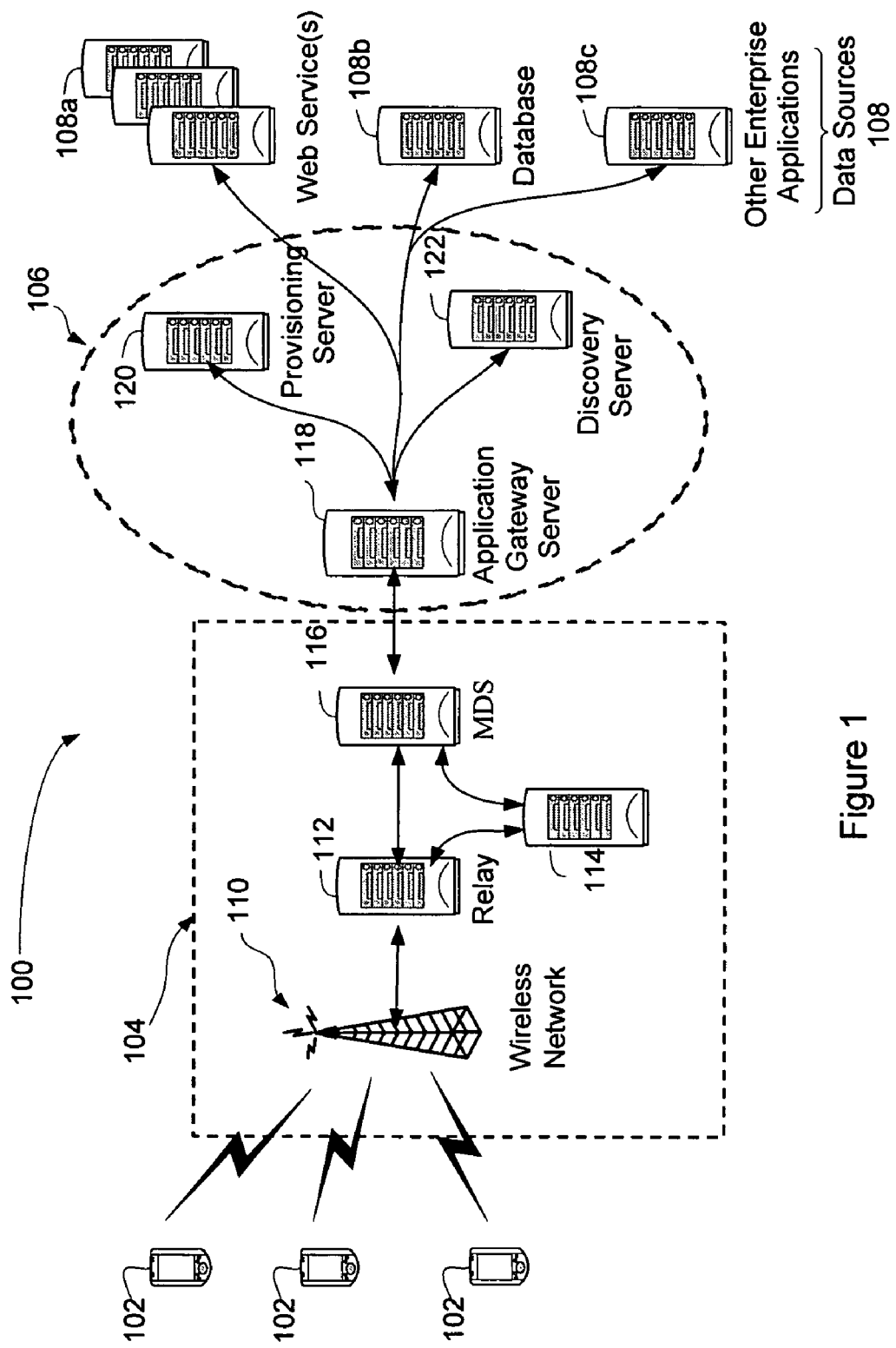
FIG. 1 shows in a schematic diagram an example of a network facilitating wireless component applications.

The patent disclosure provides a system and method to authenticate and register a wireless device (WD) with a mediator service (MS). The mediator service enables the WD to communicate with Service Providers (SP). There are many concepts embodied in. a typical device-server registration process. Fundamentally, the WD and the MS need to have some information about each other before the system can function in a proper and secure way.

In accordance with an embodiment of the present patent disclosure, there is provided a device-to-server registration system for registering a wireless device with a mediator service responsible for allowing the wireless device to communicate with a back-end service. The device-to-server registration system comprises a device-to-server registration module for communicating with a device administration service of the wireless device, and a device registration module of a mediator service for registering a wireless device with the mediator service, the device registration module communicating with the device-to-server registration module.

In accordance with another embodiment of the present patent disclosure, there is provided a method of device-to-server registration for registering a wireless device with a mediator service. The method comprises the steps of communicating with a device administration service of a wireless device to obtain information pertaining to the mediator service, and communicating with a device registration module of the mediator service to register with the mediator service.

In accordance with another embodiment of the present patent disclosure, there is provided a computer-readable medium storing instructions or statements for use in the execution in a computer of a method of device-to-server registration for registering a wireless device with a mediator service. The method comprises the steps of communicating with a device administration service of a wireless device to obtain information pertaining to the mediator service and communicating with a device registration module of the mediator service to register with the mediator service.

In accordance with another embodiment of the present patent disclosure, there is provided a propagated signal carrier carrying signals containing computer-executable instructions that can be read and executed by a computer. The computer-executable instructions are used to execute a method of device-to-server registration for registering a wireless device with a mediator service. The method comprises the steps of communicating with a device administration service of a wireless device to obtain information pertaining to the mediator service and communicating with a device registration module of the mediator service to register with the mediator service.

Advantageously, there is only the need for a one-time handshake with the mediator service, performed by the device-to-server registration system. Individual applications requiring access through the mediator service do not need to be configured and do not need to perform their own handshake/registration process. The information provided by the administration service may be updated at any time, over-the-air (OTA) or over a wired connection. Session management is simplified for the mediator service. Further, the patent disclosure removes the need for any pre-configured information on the mediator service, not only for the wireless device, but for all applications on the wireless device requiring access through the mediator service.

A system and method of the present patent disclosure will now be described with reference to various examples of how the embodiments can best be made and used. For convenience, like reference numerals are used throughout the description and several views of the drawings to indicate like or corresponding parts, wherein the various elements are not necessarily drawn to scale.

A system and method to authenticate and register a wireless device (WD) with a mediator service (MS) is provided. The mediator service enables the WD to communicate with Service Providers (SP). There are many concepts embodied in a typical device-server registration process. Fundamentally, the WD and the MS need some information about each other for the system to function in a proper and secure way.

The WD needs information regarding:
How to locate the MS.
Where to send service-related messages
What administrative privileges the device-side component of the service has.
Encryption keys for the MS, if applicable.
The MS needs information regarding:
How to locate the WD
What version of the device side component is running on the WD
The current status of the WD component(s)
Encryption keys for the WD, if appropriate.

Referring to FIG. 1, an example of a communication infrastructure is illustrated generally by numeral 100. The communication infrastructure 100 comprises a plurality of wireless devices 102, a communication network 104, an application gateway 106, and a plurality of back-end services (or systems) 108.

The wireless devices 102 are typical personal digital assistants (PDAs), but may include other devices. Each of the wireless devices 102 includes a runtime environment capable of hosting a plurality of component applications.

Component applications comprise one or more data components, presentation components, and/or message components, which are written in a structured definition language such as Extensible Markup Language (XML) code. The component applications can further comprise workflow components which contain a series of instructions such as written in a subset of ECMAScript, and can be embedded in the XML code in some implementations. Therefore, since the applications are compartmentalized, a common application can be written for multiple devices by providing corresponding presentation components without having to rewrite the other components. Further, large portions of the responsibility of typical applications are transferred to the runtime environment for component application. Details of the component applications are further described below.

The wireless devices 102 are in communication with the application gateway 106 via the communication network 104. Accordingly, the communication network 104 may include several components such as a wireless network 110, a relay 112, a corporate server 114 and/or a mobile data server (MDS) 116 for relaying data between the wireless devices 102 and the application gateway 106.

The application gateway 106 comprises a gateway server 118 a provisioning server 120 and a discovery server 122. The gateway server 118 acts as a message broker between the runtime environment on the wireless devices 102 and the back-end services 108. The gateway server 118 is in communication with both the provisioning server 120 and the discovery server 122. The gateway server 110 is further in communication with a plurality of the back-end services 108, such as Web services 108a, database services 108b, as well as other enterprise services 108c, via a suitable link. For example, the gateway server 118 is connected with the Web services 108a and database services 108b via Simple Object Access Protocol (SOAP) and Java Database Connectivity (JDBC) respectively. Other types of back-end services 108 and their corresponding links can be connected to the gateway server 118.

Preferably, each wireless device 102 is initially provisioned with a service book or IT policy facility to establish various protocols and settings, including connectivity information for the corporate server 114 and/or the mobile data server 116. These parameters may include a uniform resource locator (URL) for the application gateway server 118 as well as its encryption key. Alternatively, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Figure 2:
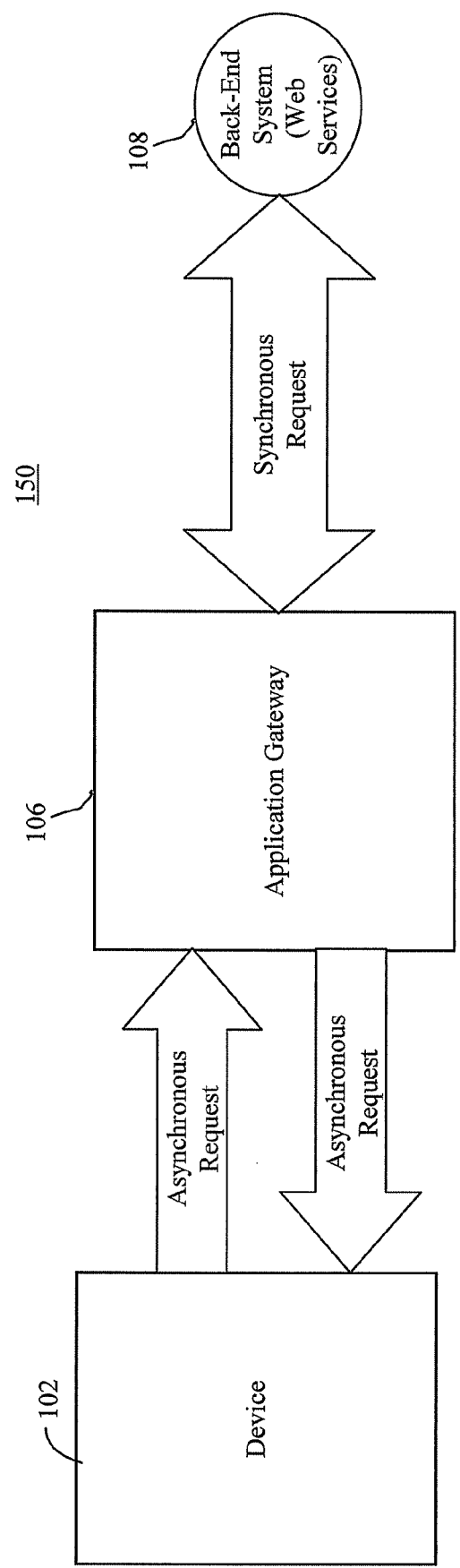
FIG. 2 shows in a flow diagram an example of a wireless component application communication model.

Referring to FIG. 2 there is illustrated in a flow diagram an example of a wireless component application communication model 150. From a high-level perspective, the overall wireless component application infrastructure 150 includes a wireless component application runtime environment (device RE) running on the device 102 and a wireless component application gateway (AG) 106 running on the server 118.

The AG 106 serves as a mediator between a wireless component application (sometimes referred to as application in this disclosure) executed by the RE and one or more back-end services 108 with which the application communicates. Often the back-end service is expected to be a Web service 108a using SOAP over HTTP or HTTPS as the transport protocol. As Web services are the most commonly expected back-end service 108, the term Web service is used interchangeable with back-end service 108 throughout this disclosure. However, it is appreciated that other types of back-end services can also be adapted to the disclosure. FIG. 2 exemplifies a synchronous link with a back-end service 108. However, it should be appreciated that the AG 106 can be in communication with back-end services 108 over asynchronous links.

The wireless component application communication model 150 is based upon an asynchronous messaging paradigm. In this model the application gateway (AG) 106 establishes and mediates the connection between the device 102 and the back-end service(s) 108 to:

1. Achieve greater flexibility in resource management.
2. Provide reliable communication link between device 102 and back-end service 108 to handle situations when wireless coverage is unstable.
3. Efficiently distribute workload between device RE 102 and AG 106.

Figure 3:
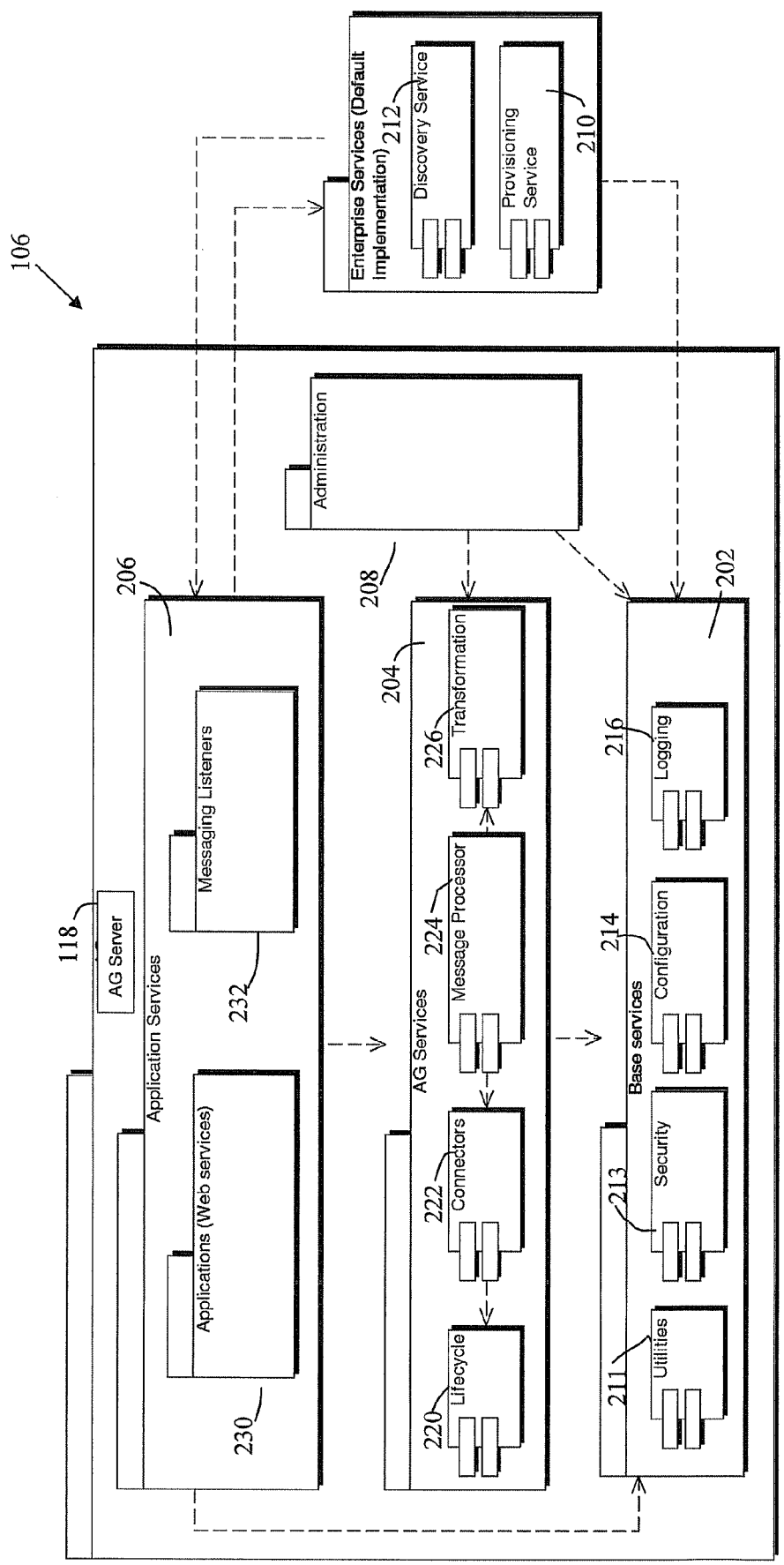
FIG. 3 shows in a detailed component diagram an example of the application gateway shown in FIG. 1.

Referring to FIG. 3, a more detailed view of an example of the application gateway 106 is shown. The application gateway server 118 includes three layers of service; a base services layer 202, an application gateway services layer 204 and an application services layer 206. The application gateway server 118 further includes an administration service 208.

A provisioning service 210 and a discovery service 212 are provided by the provisioning server 120 and discovery server 120, respectively.

At the lowest level, the base services layer 202 offers basic, domain-independent system services to other components in higher levels. Thus, for example, all subsystems in the application gateway services layer 204 and the application services layer 206 can utilize and collaborate with the subsystems in the base services layer 202. In the present embodiment, the base services layer 202 includes a utilities subsystem 211, a security subsystem 213, a configuration subsystem 214, and a logging subsystem 216.

The application gateway services layer 204 provides wireless component application domain-specific services. These services provide efficient message transformation and delivery to back-end services 108 and provide wireless device 102 and component application lifecycle management. In the present embodiment, the application gateway services layer 204 includes a lifecycle subsystem 220, a connector subsystem 222, a messaging subsystem 224, and a transformation subsystem 226.

The application services layer 206 sits at the top of the architecture and provides external program interfaces and user interfaces using subsystems provided by the lower layers. For example, various applications such as a service provider lifecycle application, a packaging application and a message listening application provide external program interfaces since they communicate primarily with applications on external systems. Similarly, an administration application provides a user interface by providing a user with the ability to access and potentially modify application gateway data and/or parameters.

The administration service 208 is responsible for administrative system messages, administration of the wireless devices 102, runtime administration of the application gateway subsystems, support and display system diagnostics, and administration of default implementations of the provisioning and discovery services.

The messaging listening application (or messaging listeners 232) provides an interface for receiving messages from the wireless devices 102 as well as external sources and forwarding them to the messaging subsystem. Further, the message listening application 232 typically authenticates that the source of the message is valid.

Figure 4:
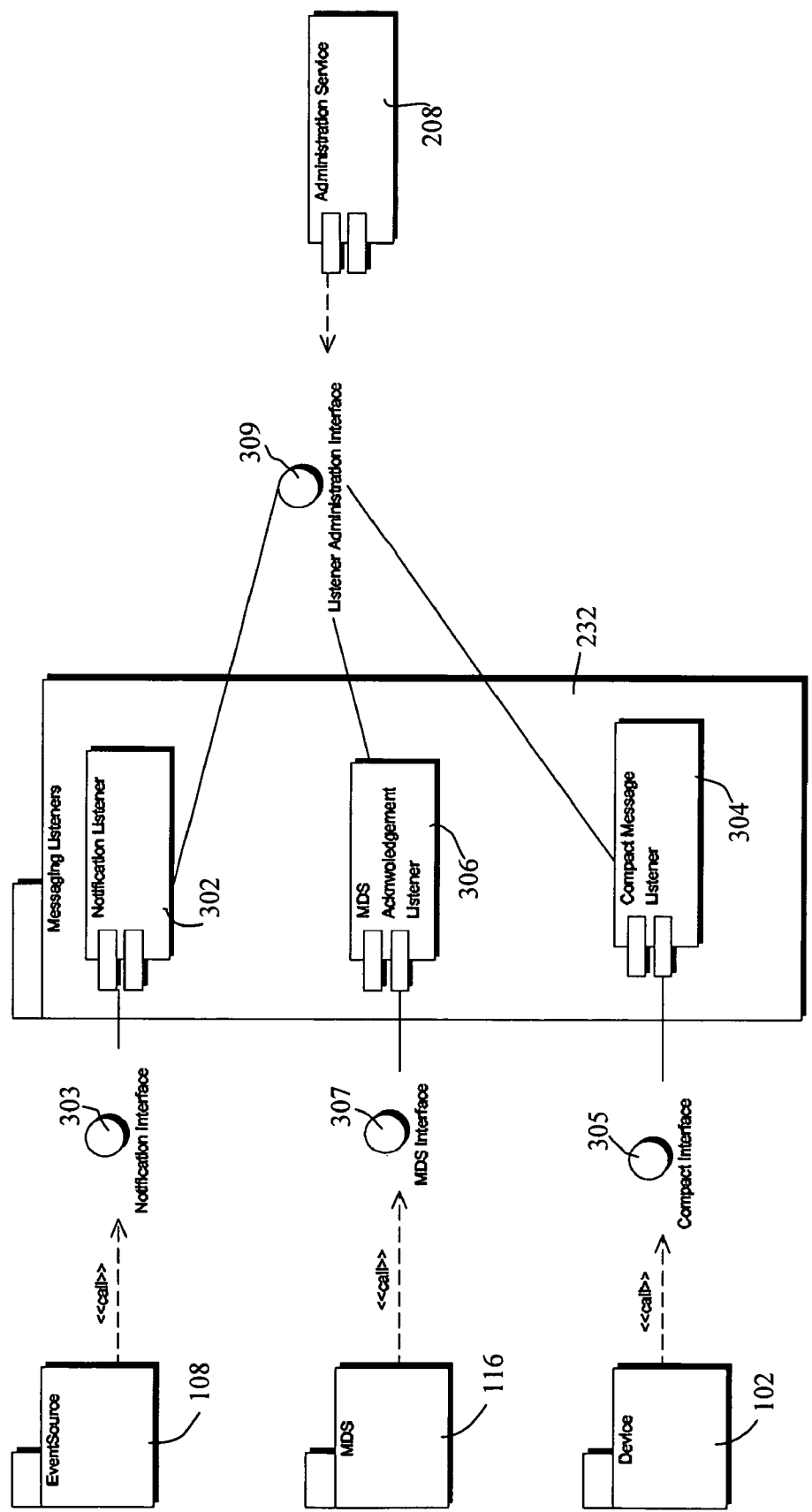
FIG. 4 shows in an interface diagram an example of a security subsystem.

Referring to FIG. 4, an example of the message listening application 232 is shown in greater detail. The message listening application 232 includes three listeners: a notification listener 302, a compact message listener 304, and a mobile data service acknowledgement listener 306. The notification listener 302 receives notification and response messages from event sources 108c via a notification interface 303. Other message listener interfaces may be added.

In one embodiment, the notification interface 303 may be implemented using Web Service (WS) Eventing. Web services often want to receive messages when events occur in other services, such as the event sources, and applications. A mechanism for registering interest is provided in the art by WS Subscription. WS Subscription defines a protocol for one Web service, referred to as a subscriber, to register interest with another Web service, referred to as an event source, for receiving messages about events, referred to as notifications. When the event source notifies the subscriber of an event, it is referred to as WS Eventing.

The compact message listener 304 receives messages from the mobile devices 102 via a compact message interface 305. The mobile data service acknowledgment listener 306 receives and acknowledges notifications from the mobile data service 116 via a mobile data service interface 307. Each of the three listeners 302, 304 and 306 receive administrative messages from the administration service 208 via a listener administrative interface 309.

In the present embodiment the listener interfaces 303, 305, 307, and 309 are configured using Hypertext Transfer Protocol/Hypertext Transfer Protocol over Secure Socket Layer (HTTP/HTTPS). However, these protocols have been selected as a design choice, and other protocols may be used when desired. Accordingly, external systems transmit a HTTP/HTTPS request, which is received by the appropriate listener. The listener takes the message, makes minimal transformations, and forwards it to the messaging subsystem 224. The transformations include copying HTTP header information into message object fields. For example, the HTTP header information may identify the mobile data service 116 and wireless device 102 from which the message originated.

As previously described, the message listening application authenticates that the source of the message, be it the mobile data service 116, the wireless device 102 or event source 108, is valid.

Further, if reliable messaging is required, service availability is ensured and the listeners deal with solutions to availability attacks. In order to facilitate this, the messaging subsystem defines a threshold for a maximum number of messages and connections for a given time period from any back-end service 108, component application or wireless device. The administrator can modify this threshold as desired, as well as allow for specific exceptions via the administration service 208.

Further, since message interception and replay attack is possible, the listeners detect and prohibit this attack using mechanisms that identify replayed messages. These mechanisms typically include the use of a nonce. A nonce is defined as parameter that varies with time. A nonce can be a timestamp or other special marker intended to limit or prevent the unauthorized replay or reproduction of a message. Because a nonce changes with time, it can be used to determine whether or not a message is original, or a replay or reproduction of the original message. The use of a nonce for preventing interception and replay attacks is known in the art and need not be described in detail, as standard implementations are utilized.

Further, other technologies, such as sequencing, can also be used to prevent replay of application messages in addition to, or in lieu of, the time timestamp technique. Once again, such techniques are known in the art and need not be described in detail, as standard implementations are utilized.

Figure 5:
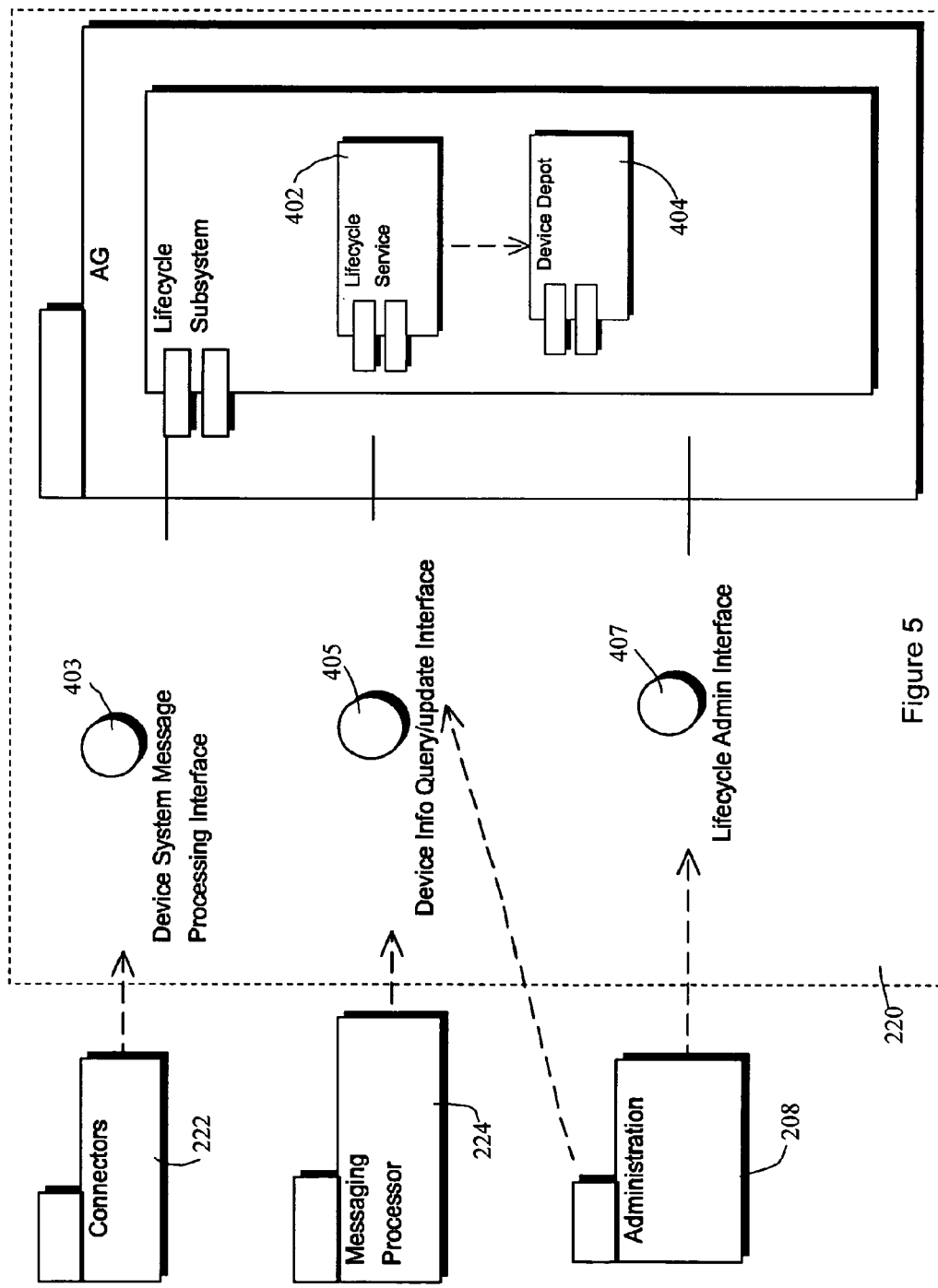
FIG. 5 shows in an interface diagram an example of the lifecycle subsystem in greater detail.

Referring to FIG. 5, an example of the lifecycle subsystem 220 is shown in greater detail. The lifecycle subsystem includes a lifecycle service 402 and a device depot 404.

The lifecycle service 402 processes device initiated messages that relate to the wireless device 104, the runtime environment lifecycle and the component application lifecycle. Such messages, for example, may relate to a wireless device registration or suspension, wireless device swap, wireless device availability, a component application installation, upgrade, or deletion, and runtime environment upgrades. These messages are communicated to and from the connector subsystem 222 via a device system message processing interface 403.

The lifecycle service 402 further provides the ability to query for wireless devices and component application using various filters. In order to facilitate this feature, the lifecycle service 402 communicates with the messaging subsystem 224 and the administration subsystem 208 via a device information query/update interface 405. In the present embodiment, the device information query/update interface 405 is implemented using a set of Java application program interfaces (APIs) for querying and updating device information. Typical interfaces include those for managing the wireless device's security and client administration policy.

The lifecycle subsystem 220 manages a security profile for each wireless device 104 registered with the application gateway 106 in the device depot 404. Each security profile includes a secure symmetric key for each device. This key is used for secure communication between the wireless device 104 and application gateway 106.

The client administration policy includes retrieving wireless device status, searching for component applications satisfying certain modifiable criteria, and searching for devices satisfying certain modifiable criteria. For example, it may be desirable to determine which component applications are installed on all the wireless devices or which wireless devices have specific component applications installed.

Yet further, a lifecycle administration interface 407 is provided for facilitating the management of the lifecycle subsystem 402 and the device depot 404 by the administration subsystem 208. For example, the administration subsystem can indicate the availability of a new version of a component application or the runtime environment.

Accordingly, the lifecycle service 402 manages the status of each of a plurality of assigned wireless devices 102, including the runtime environment and component applications stored therein. Information such as the runtime environment, component application status, and the wireless device security settings are stored in the device depot 404. The security settings may include, for example, client administration policy and the wireless device's encryption key.

The application gateway server 118 also allows for the use of third party lifecycle components, also referred to as lifecycle service providers, which are typically external to the application gateway 106. In order to facilitate lifecycle service providers, lifecycle service provider listeners are provided at the application services layer. The lifecycle service provider listeners are responsible for receiving notification on all lifecycle system messages from the lifecycle service providers and transmitting them to the administration subsystem 208 for processing. Further, the lifecycle service providers can access the administration service to configure the application gateway server 118 or send system messages.

Figure 6:
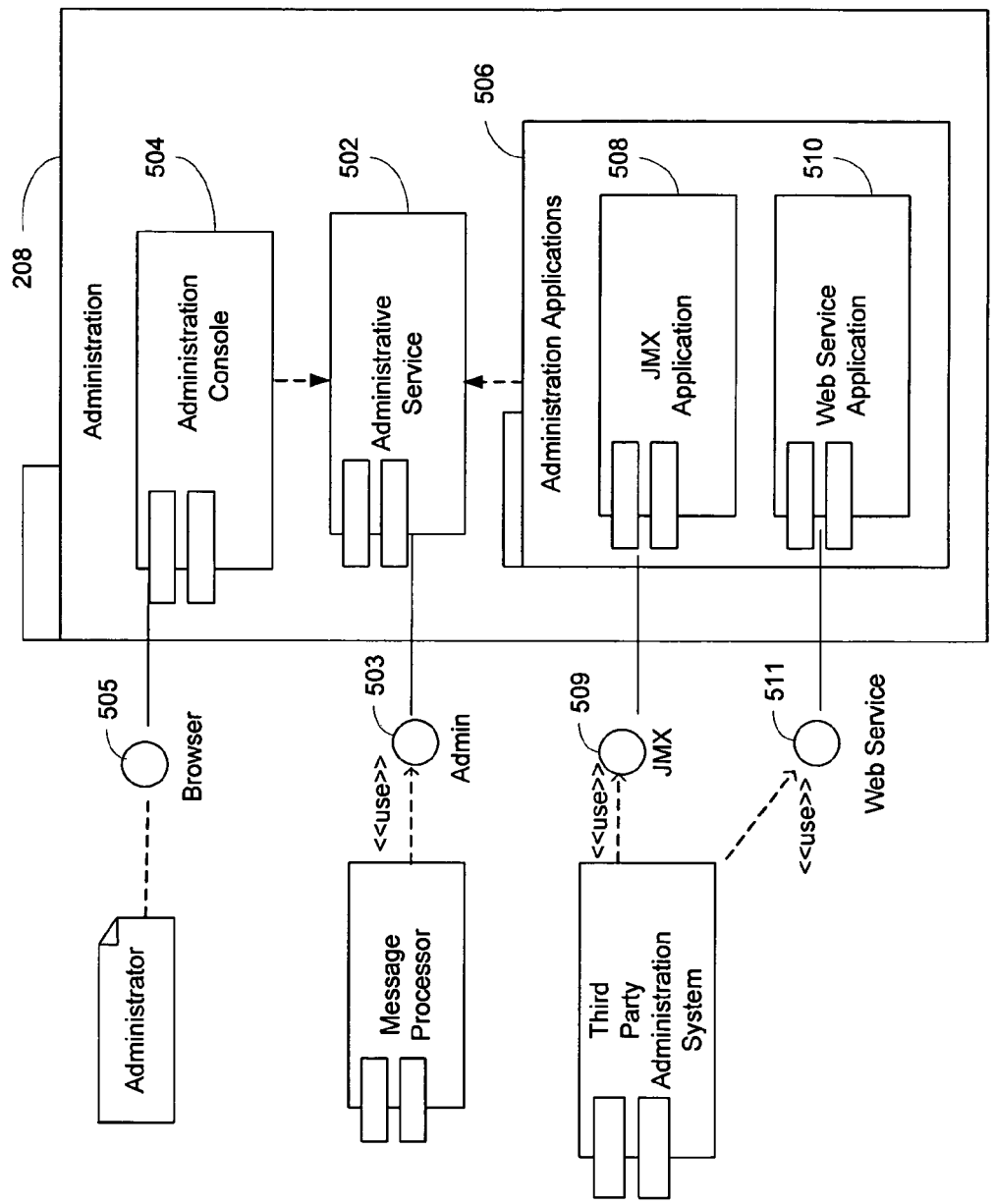
FIG. 6 shows in an interface diagram an example of the administration subsystem in more detail.

The administration subsystem 208 administers system messages, system devices, application gateway subsystems, system diagnostics, and default implementations of the provisioning and discovery services. Referring to FIG. 6, a more detailed view of an example of the administration subsystem 208 is shown. The administration subsystem 208 includes an administration service 502, an administration console 504 and administration applications 506. The administration applications 506 include a Java Management Extension (JMX) application 508 and a Web service application 510.

A browser interface 505 couples an administrator with the administrator console 502 for administrating the application gateway 106. An administrator interface 503 couples the administration service 502 with the messaging subsystem 224 for delivering administrative system messages. The administration applications 506 are coupled to their respective third party administrative applications via an appropriate interface. For example, the JMX application 508 is coupled via a JMX interface 509 and the Web service application 510 is coupled via a Web service interface 511.

The administration service 502 processes component application and runtime environment lifecycle events initiated by the administrator or the lifecycle service providers through the lifecycle administration interface. Examples of such events include installing a component application using push provisioning, refreshing the encryption key, upgrading the component application or runtime components, removing component applications, quarantining component applications and removing component applications from quarantine, applying component application cleanup script, querying the runtime environment for a status update, and updating the client administration policy.

The administration service 502 is also responsible for administration of the wireless devices 104. Accordingly, the administration service 502 is capable of responding to wireless device registration system messages and maintaining wireless device settings such as the security key, mobile data service URL, runtime version and status. The administration service 502 further supports the ability to list devices in accordance with predefined filter characteristics, such as by querying a device for its component application and runtime environment settings and querying for component applications on specific devices.

The administration service 502 also provides the administrator with the ability to access application gateway subsystems runtime information and settings, per cluster node if applicable, and perform system-related tasks. Such tasks include viewing the message subsystem 224 runtime information, including message information per wireless device 12 and per component application, as well as the number of messages in queue, and a snapshot of the number of pooled objects of specific type. The administrator is able to modify specific settings at runtime as well as delete or reschedule expired messages.

Other information and settings provided by the administration service 502 include the following. The application gateway subsystem parameters are available for modification. Therefore, for example, the administrator can enable and disable various features at runtime. Database settings can be configured for a centralized application gateway database. This database may include all of the subsystem depots. The application gateway URLs can be configured to be accessible to external systems. For example, a URL may be assigned to the administration application 506 to allow access by third parties. Also a URL may be assigned to the packaging application to allow access by the provisioning service.

The administration service 502 may also store discovery service credentials, service provider credentials, mobile data service parameters and security parameters. The discovery service credentials can be used to authenticate the discovery service upon receiving a notification message that a component application is available. Similarly, service provider credentials, including its URL, can be used to authenticate a service provider upon receiving component application or runtime environment lifecycle messages. Mobile data service parameters can be used to connect the administrator to the mobile data service and include its IP address, user identification and password. The application gateway security parameters and settings, such as the application gateway public and private key and key refreshing policy, are used for encrypting communication between the application gateway and external applications.

The administration service 502 is also used for registering additional subsystems such as custom connectors and lifecycle listeners, for example.

The Web service application 510 uses Web services for directing service provider-initiated system messages to the administration service 502 for processing and delivery to device, if required.

Similarly, the JMX application 508 directs service provider-initiated system messages to the administration service 502 for processing and delivery to device, if required. However, the JMX interface 509 is an open interface that any management system vendor can leverage. The administration infrastructure is based on JMX technology, which is an open technology for system management and monitoring. Each management system implements a set of Mbeans objects in order to be configurable. These objects must be registered with an MbeanServer running in the process space of the object, in accordance with JMX specification.

Since the application gateway 106 can potentially run in a distributed environment, that is some subsystems may run on different application servers, then each application server needs to have its own implementation of the MbeanServer. Further, each subsystem needs to be configured using a separate Administration Console provided by the corresponding application server, or using third party console that knows how to access the functionality provided by MbeanServer.

A runtime environment framework container is a client-resident container within which applications are executed on a device. The container manages the application lifecycle on the device (provisioning, execution, deletion, etc.) and is responsible for translating the metadata (XML) representing an application into an efficient executable form on a device. The container provides a set of services to the application, as well as providing support for optional JavaScript. These services include support for UI control, data persistence and asynchronous client-server messaging, etc.

Figure 7:
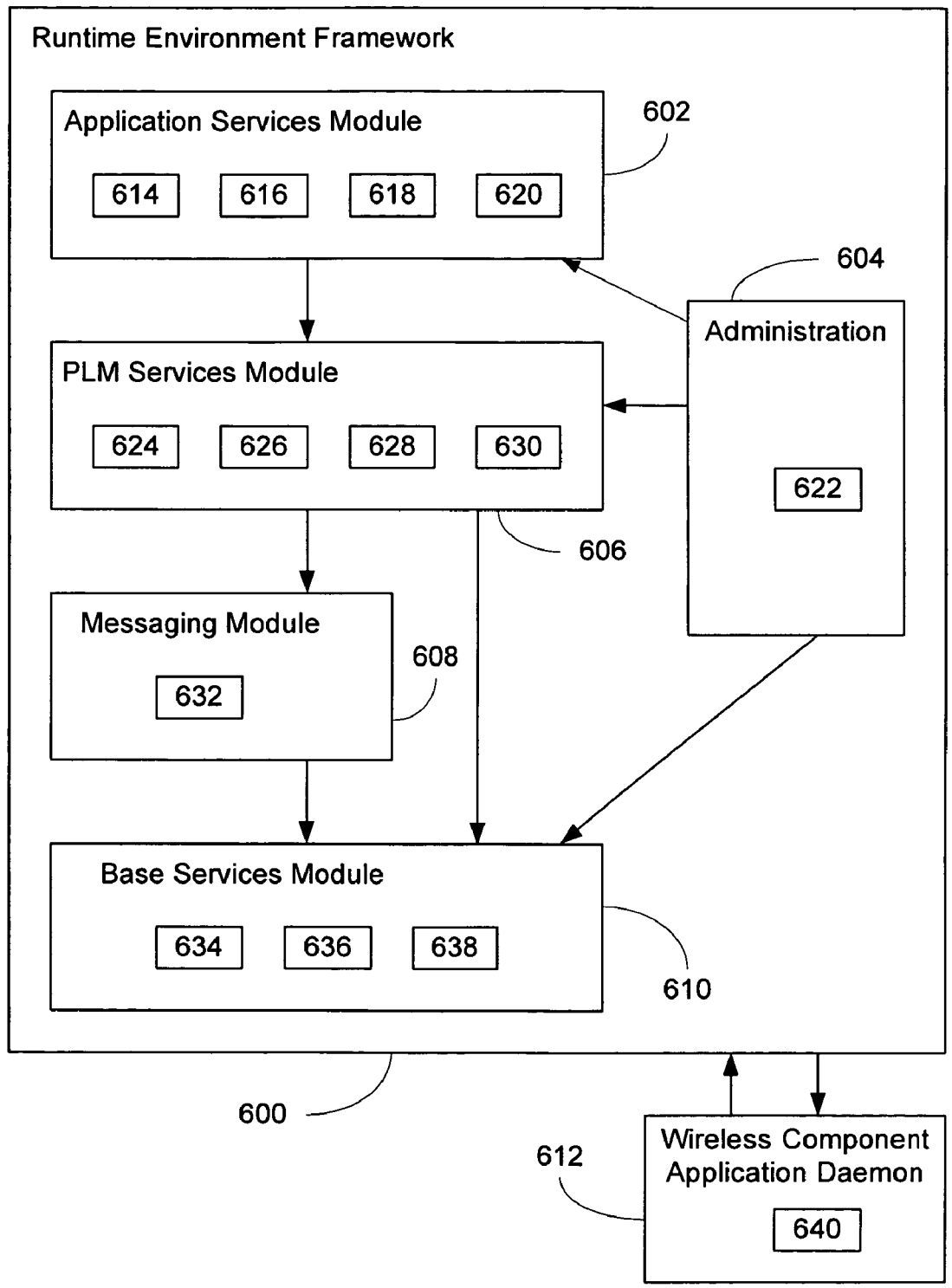
FIG. 7 shows in a component diagram an example of a runtime environment structure of the wireless component application.

FIG. 7 shows an example of a runtime environment framework 600. The runtime environment framework 600 comprises an application services module 602, an administration module 604, a provisioning and lifecycle management (PLM) services module 606, a messaging module 608, and a base services module 610. Components may be removed or added to the runtime environment framework 600. The runtime environment framework 600 communicates with a wireless component application daemon 612.

The application services module 602 includes a screen service 614 for providing an interface between currently running applications and a user, an interpreter service 616 for providing an execution environment for the applications, a metadata service 618 for handling and mediating application metadata related access, and an access service 620 for allowing applications to access other applications on the device 102.

The administration module 604 includes a control center 622 for handling a user interface of the wireless component application runtime environment framework 600, processing user interaction with the wireless component application runtime environment framework 600, and for integrating the wireless component application runtime environment framework 600 with the network system 100.

The PLM services module 606 includes a RE container 624 for coordinating RE container upgrades and backup/restore processes and for implementing a default error handling mechanism for the RE framework 600, a discovery service module 626 for locating applications in an application repository, a provisioning service 628 for application provisioning (including application downloads, installation and upgrades), and a lifecycle service 630 for registering, maintaining information for, and administrating applications.

The messaging module 608 includes a messaging service module 632 for message queuing, message (de)compacting, and message distribution.

The base services module 610 includes a persistence service 634 for storing a RE profile (including its version, directory, client administration policy, application administration policies, security keys, available upgrades, etc.), storing an application profile (including its version, metadata, application persistence data components, application persistable global data and application resource, available upgrades, etc.), and storing reliable messages (including outgoing messages pending delivery due to out of coverage, and incoming reliable messages pending processing). The base services module 610 also includes a security service 636 for restricting access to RE services, providing message authentication, integrity, and encryption. The base services module 610 also includes a communication service 638 for sending and receiving messages in and out of the device 102, downloading resources and files from appropriate repositories, and notifying interested RE services about wireless coverage events.

The wireless component application daemon module 612 includes a daemon 640 for restarting the wireless component application process whenever it stops due to a fatal exception.

Figure 8:
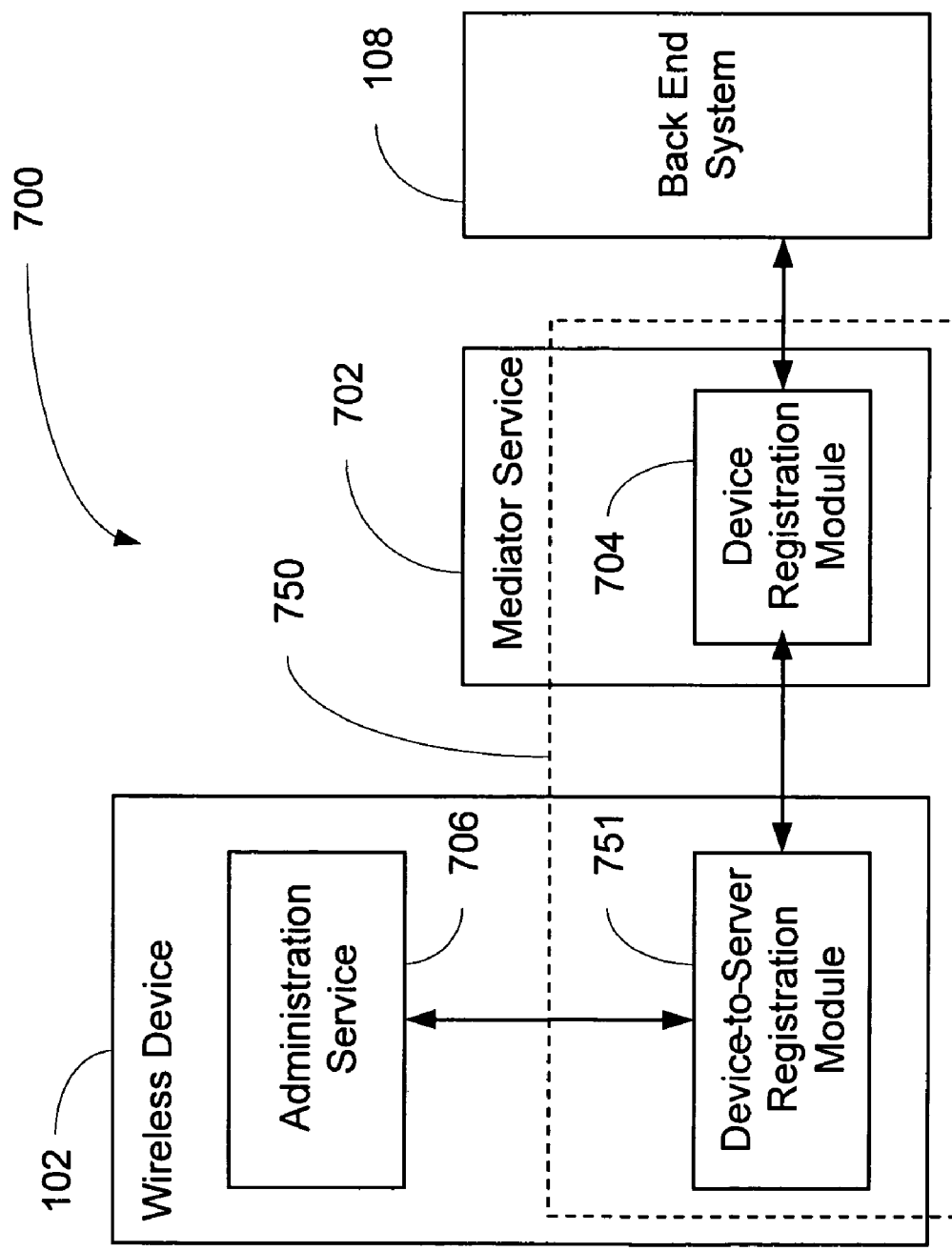
FIG. 8 shows in a component diagram an example of a device-to-server registration environment, in accordance with an embodiment of the present patent disclosure.

FIG. 8 shows in a component diagram an example of a device-to-server registration environment 700, in accordance with an embodiment of the present patent disclosure. The device-to-server registration environment comprises a wireless device (WD) 102, a mediator service (MS) 702 for liaising the WD 102 with a back-end service 108. The back-end service can be a Web service, data repository, enterprise application or any other type of information or functionality providing service. The wireless device 102 comprises a device administration service 706, and a device-to-server registration module 751 for registering the WD 102 with the mediator service 702. Preferably, the device-to-server registration module 751 is implemented in a container application. The mediator service 702 comprises a device registration module 704 for registering the WD 102 to the mediator service 702. The device-to-server registration module 751 and the device registration module 704 can be considered as a device-to-server registration system 750.

The registration process is between the WD 102 and the MS 702. Preferably, the back-end service 108 is not aware of the WD 102, i.e., the WD 102 is registered with the MS 702, in one example, the MS 702 being the application gateway 106. Preferably, the mediator service 702 is implemented in the application gateway 106, and the mediator service 702 is implemented in the application gateway server 118.

Figure 9:
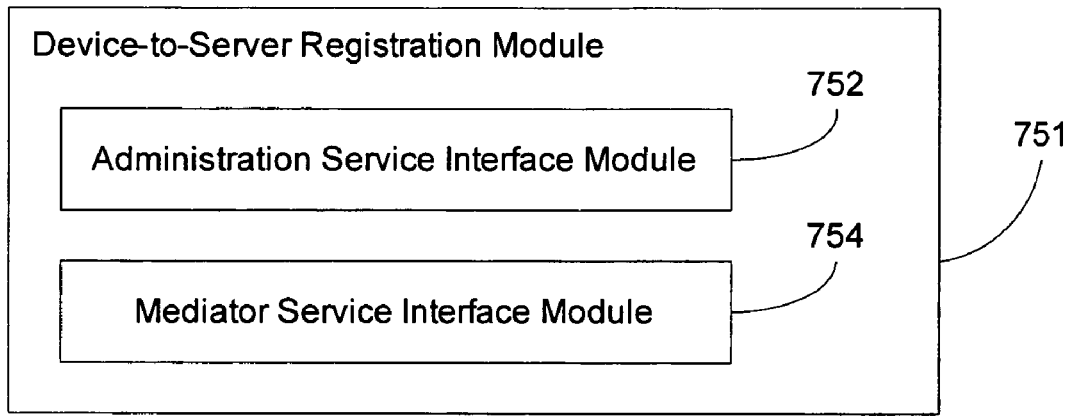
FIG. 9 shows in a component diagram an example of a device-to-server registration system, in accordance with an embodiment of the present patent disclosure.

FIG. 9 shows in a component diagram an example of a device-to-server registration module 751, in accordance with an embodiment of the present patent disclosure. The device-to-server registration module 751 comprises an administration interface module 752 for communicating with the device administration service 706, and a mediator service interface module 754 for communicating with the device registration module 704. Other components may be added to the device-to-server registration module 751, including a security service layer. The device-to-server registration module 751 uses the security service to generate the WD security key (if required) and to handle the synchronous security handshake that kicks-off the registration sequence. The security service receives the MS security keys (if required) as part of the handshake response and provides it to the rest of the runtime environment.

Communicating with the administration service interface module 752, the device administrator provides configuration information to the WD, at any time over-the-air (OTA) or over the wire. A central container application (holding the device-to-server registration module 751) of the WD 102 retrieves this information and initiates a security handshake with the MS 702, possibly exchanging security keys (whether this is done or not depends on the MS setup). Preferably, only the security keys are sent at this time so that they may be used to encrypt any further messages. When the MS 702 responds that the handshake succeeded, the central container application sends a status message providing required information regarding the current state of the central container application. Once the MS 702 receives this information, it sends administrative information to the central container application to be used as the context for the operation of the system between the central container application and this particular MS 702. At this point the registration process is complete.

Advantageously, the central container application on the WD 102 registers with the MS 702. In this way, there is only the need for a one-time handshake with the MS 702, performed by the central container application. Individual applications requiring access through the MS 702 do not need to be configured and do not need to perform their own handshake/registration process.

Another advantage of the device-to-server registration system 750 is that information required to perform the registration is provided by the device's administrator and not by the user. Thus, the MS 702 does not have any initial information for this WD 102. The administrator provides this information in the device configuration, and the device-to-server registration system 750 retrieves this information and initiates the registration.

Another advantage of the device-to-server registration system 750 is that the information provided by the administrator may be updated at any time, over-the-air (OTA) or over a wired connection. The container application is automatically notified that the information may have changed. The container then may perform another registration process, if required. This could result in container application being registered with a different MS, or to be connected to a different communication port on the same MS 702.

Another advantage of the container application is that having a central container application managing all applications on the device, and being responsible for the registration process, simplifies session management for the MS 702. The MS administrator may manage the session/WD as a whole for system management functions not suitably applied on a per-application basis. Further, this registration process removes the need for any pre-configured information on the MS 702, not only for the WD 102, but for all applications on the WD 102 requiring access through the MS 702.

Figure 10:
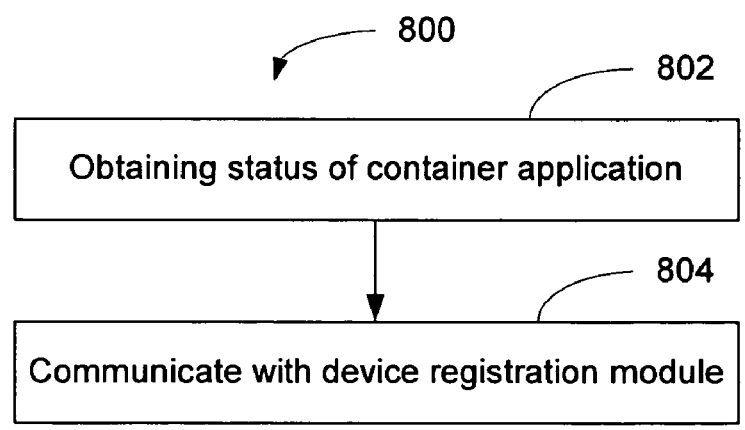
FIG. 10 shows in a flowchart an example of a method of device-to-server registration for registering a wireless device with a Web service server through a mediator service, in accordance with an embodiment of the device-to-server registration system.

FIG. 10 shows in a flowchart an example of a method of device-to-server registration (800) for registering a WD 102 with a mediator service 702, in accordance with an embodiment of the device-to-server registration system 750. The method (800) comprises the steps of communicating with the device administration module 706 to obtain the status of the container application (802), and communicating with the device registration module 704 (804).

Figure 11:
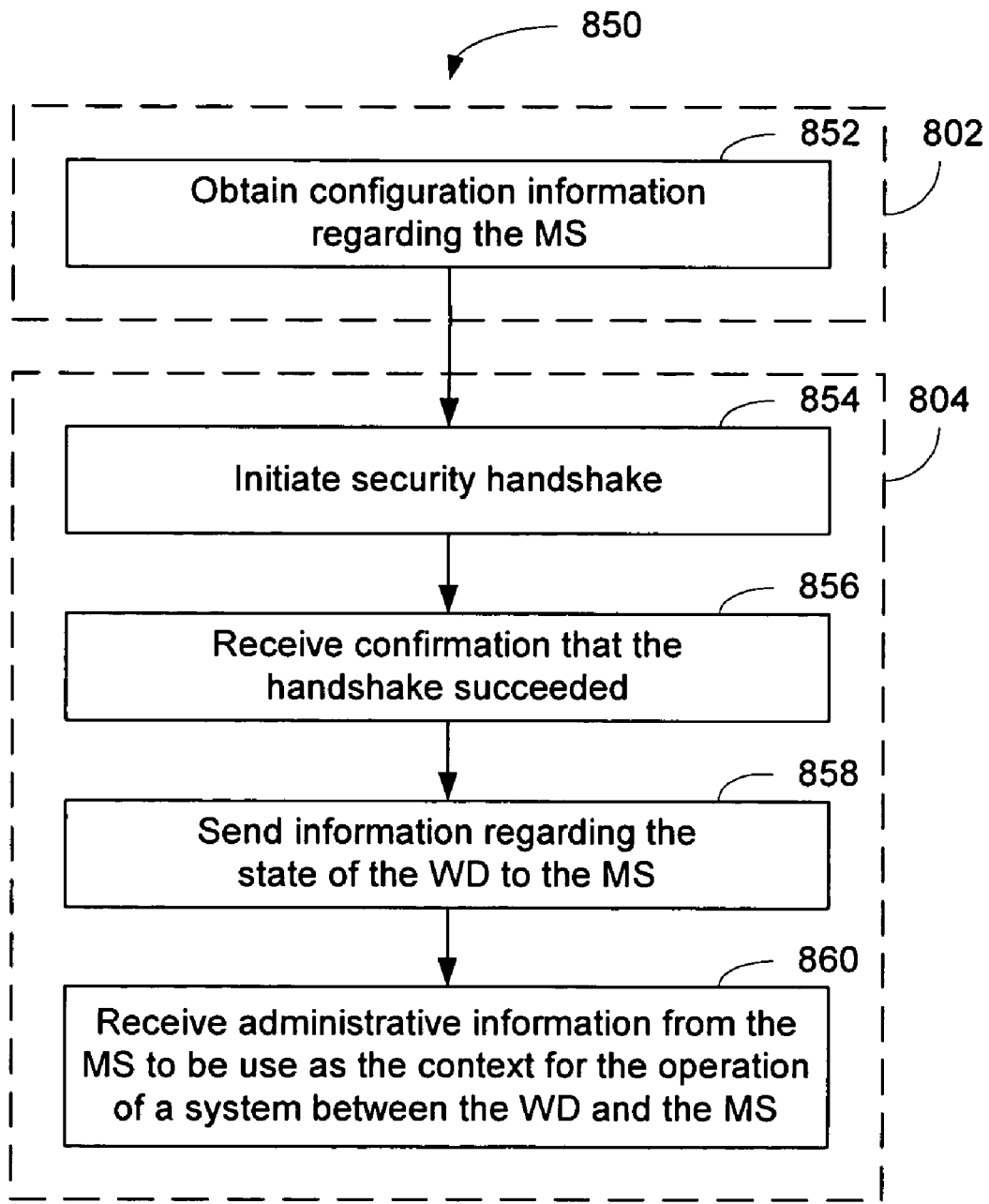
FIG. 11 shows in a flowchart a more detailed example of the method of device-to-server registration, in accordance with an embodiment of the device-to-server registration system.

FIG. 11 shows in a flowchart a more detailed example of the method of device-to-server registration (850), in accordance with an embodiment of the device-to-server registration system 750. The step of communicating with (802) includes the step of obtaining configuration information regarding the MS 702 (852). The step of communicating with the device registration module 704 (804) includes the steps of initiating a security handshake with the MS 704 (854), receiving confirmation that the handshake succeeded (856), sending information regarding the state of the WD to the MS (858), and receiving administrative information from the MS to be used as the context for the operation of a system between the WD (and container application) and the MS (860). Other steps may be added to the method (850). The administrative information from the MS may also include information used as the context for the operation of the container application with the WD itself, and also information related to the operation between individual applications and the WD itself.

Advantageously, the initiation of the WD 102 to MS 702 process is possible at any time, and over-the-air (OTA). This means that the system administrator (SA) can initiate the registration process without having access to the WD 102.

This initiation process also gives the SA the ability to change which MS 702 the WD 102 is registered with or to de-register the WD 102 altogether (i.e., disable the service on the WD).

Figure 12:
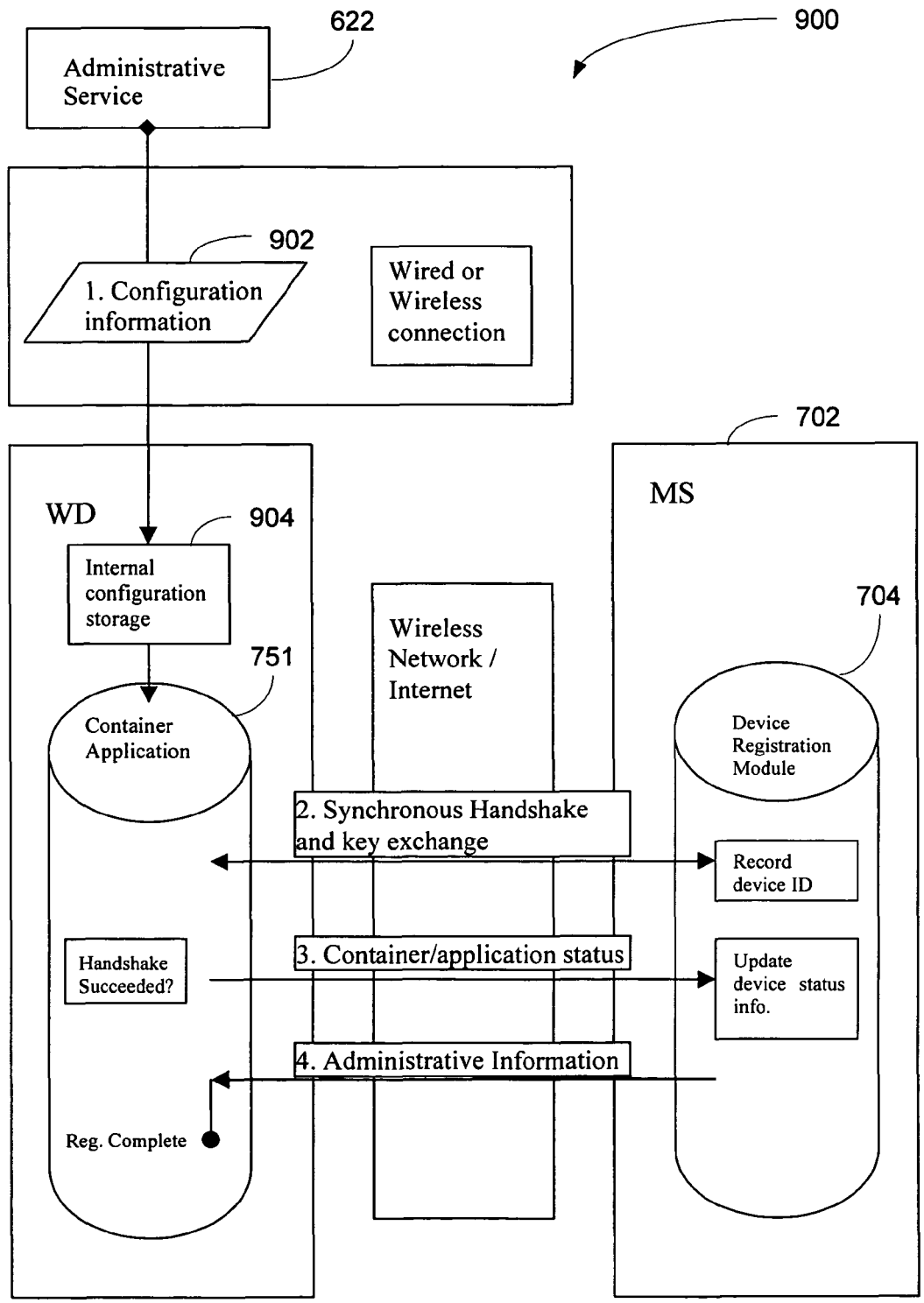
FIG. 12 shows in a sequence diagram an implementation of the device-to-service registration system described above, in a general default mediator service case.

FIG. 12 shows a diagrammatic representation of an implementation 900 of the device-to-service registration system 750 described above, in a general default MS 702 case. The implementation 900 shows an administrative service 622 providing configuration information 902 to a container application or device-to-server registration module 751 of a WD 102. The information can be stored in internal configuration storage 904 of the WD 102. Preferably, the configuration information is part of some external facility used to give the WD information, and this external facility is stored on the device as part of its normal function. When the container application is notified that this information has arrived, the container application retrieves it, uses it to start the registration process, and stores it internally in order to restart the registration process in case of unexpected errors, in order to compare to new configuration information to determine whether to start a new registration process or not, or for any other action desirable for the overall system functionality. The device-to-server registration module 751 initiates a handshake and key exchange with a device registration module 704 of a MS 702. Identification information of the WD 102 is stored in the device registration module 704. If the handshake succeeded, the status of the WD 102 is sent from the device-to-server registration module 751 to the device registration module 704 where the information is used to update the WD 102 status information in the MS 702. Administrative information is sent from the device registration module 704 to the device-to-server registration module 751.

It is possible for a specific application on the WD 102 to communicate with a separate MS 702 dedicated for use with this particular application, rather than the default one with which the container application (or device-to-server registration module 751) is registered. An abbreviated registration process is used in this situation. The configuration information received by the WD 102 as a whole is not used since it is not the address information for the dedicated MS 702. Preferably, the information to address and connect to the dedicated MS is in the deployment descriptor, the bundle of information describing the particular application hosted in the container application, which is used to install the application on the WD 102. This information may be retrieved or accessed in other ways.

Once the application is installed, the container application (or device-to-server registration module 751) notes that the application wishes to use a dedicated MS 702, so it initiates the same security handshake procedure as the main registration process does, except with the dedicated MS 702. As opposed to the default MS 702 registration process, this is all that is required for the dedicated MS situation.. Advantageously, the device status and administrative information are not required for the functioning of a specific application with its dedicated MS 702. Preferably, any messages to the SP for this application are rerouted through the dedicated MS 702 by the container application 751 using the dedicated MS 702 address provided in the deployment descriptor, and using the security keys generated by the handshake with the dedicated MS 702.

Figure 13:
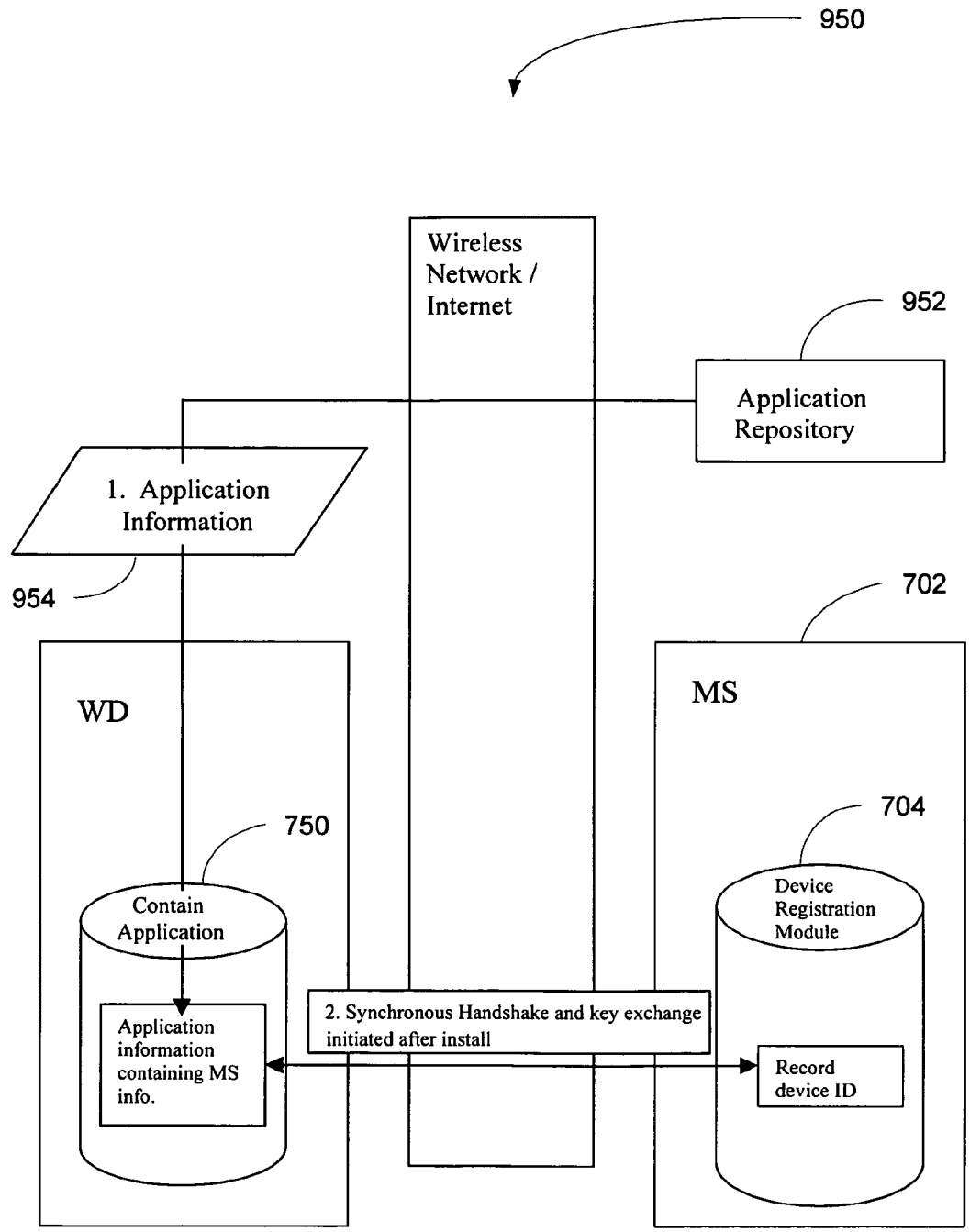
FIG. 13 shows in a sequence diagram another implementation of the device-to-service registration system described above, in a dedicated mediator service case.

FIG. 13 shows a diagrammatic representation of another implementation 950 of the device-to-service registration system 750 described above, in a dedicated MS 702 case. The implementation 950 shows an application repository 952 providing application information 954 (or deployment descriptor from discovery) to a container application or device-to-server registration module 751 of a WD 102. The application information 902 contains information regarding a MS 702. The device-to-server registration module 751 initiates a handshake and key exchange with a device registration module 704 of a MS 702. Identification information of the WD 102 is recorded in the device registration module 704.

The systems and methods according to the present patent disclosure may be implemented by any hardware, software or a combination of hardware and software having the above described functions. The software code, either in its entirety or a part thereof, may be stored in a computer-readable memory. Further, a computer data signal representing the software code which may be embedded in a carrier wave may be transmitted via a communication network. Such a computer-readable memory and a computer data signal are also within the scope of the present patent disclosure, as well as the hardware, software and the combination thereof.

While particular embodiments of the present patent disclosure have been shown and described, changes and modifications may be made to such embodiments without departing from the true scope of the patent disclosure.

What is claimed is:

1. A device-to-server registration system for registering wireless devices with a mediator service on a server responsible for allowing applications on the wireless devices to communicate with back-end services, the device-to-server registration system comprising:

a device-to-server registration module of a container application on each of the wireless devices for obtaining configuration information regarding the mediator service from an administration service on each of the wireless devices to start a registration process by initiating a security handshake with the mediator service, receiving confirmation that the handshake has succeeded, and providing status information, of the container application on each of the wireless devices, to the mediator service on the server; and a device registration module provided on the mediator service for registering each of the wireless devices with the mediator service identified by obtained configuration information from each of the wireless devices, based on status information of the container applications from each of the plurality of wireless devices and providing administrative information to the device-to-server registration module of each of the wireless devices, the administrative information providing a context for the container application to enable each of the wireless devices to communicate with the respective back-end services;

wherein the configuration information identifies the mediator service for each of the wireless devices to register with, and the status information provides relevant information of the container application of the respect wireless device required by the device registration module identified by the configuration information.

2. The device-to-server registration system as claimed in claim 1, wherein the back-end service is a Web service.

3. The device-to-server registration system as claimed in claim 1, wherein the back-end service is a data repository.

4. The device-to-server registration system as claimed in claim 1, wherein the back-end service is an enterprise application.

5. The device-to-server registration system as claimed in claim 1, wherein the device-to-server registration module includes:

a device administration service interface module for communicating with the device administration service on the wireless device to obtain the configuration information; and a mediator service interface module for communicating with the device registration module of the mediator service.

6. The device-to-server registration system as claimed in claim 1, further comprising a security service for managing secure communication between the mediator service and the wireless device.

7. The device-to-server registration system as claimed in claim 1, wherein a particular application on the wireless device is registered to a particular mediator service.

8. The device-to-server registration system as claimed in claim 7, wherein the container application is a runtime environment 9. A method of device-to-server registration for registering a wireless device with a mediator service on a server responsible for allowing applications on the wireless devices to communicate with back-end services, the method executed on the wireless device comprising:

obtaining configuration information regarding the mediator service from an administrative service on the wireless device wherein the configuration information identifies the mediator service to register the wireless device with;

obtaining status information of a container application on the wireless device wherein the status information provides relevant information of the container application required by the device registration module identified by the configuration information;

initiating a security handshake between a device-to-server registration module of the container application on the wireless device with the mediator service;

receiving confirmation that the handshake has succeeded;

communicating with a device registration module of the mediator service, identified by the obtained configuration information to register the wireless device with the mediator service by providing the status information; and receiving administrative information from the mediator service to be used as context for the container application to enable communication between the wireless device and respective back-end service.

10. The method as claimed in claim 9, wherein the container application is a runtime environment.

11. A computer-readable memory storing instructions or statements for executing in a computer a method of device-to-server registration for registering a wireless device with a mediator service on a server responsible for allowing applications on the wireless devices to communicate with back-end services, the method comprising:

obtaining configuration information regarding the mediator service from an administrative service on the wireless device wherein the configuration information identifies the mediator service to register the wireless device with;

obtaining status information of a container application on the wireless device wherein the status information provides relevant information of the container application required by the device registration module identified by the configuration information;

initiating a security handshake between a device-to-server registration module of the container application on the wireless device with the mediator service;

receiving confirmation that the handshake has succeeded; and communicating with a device registration module of the mediator service, identified by the obtained configuration information, to register the wireless device with the mediator service by providing the status information;

receiving administrative information from the mediator service to be used as context for the container application to enable communication between the wireless device and respective back-end service.

* * * * *